Oct. 6, 1925.
A. KREBS
1,555,992
METAL CUTTING MACHINE
Filed April 11, 1924
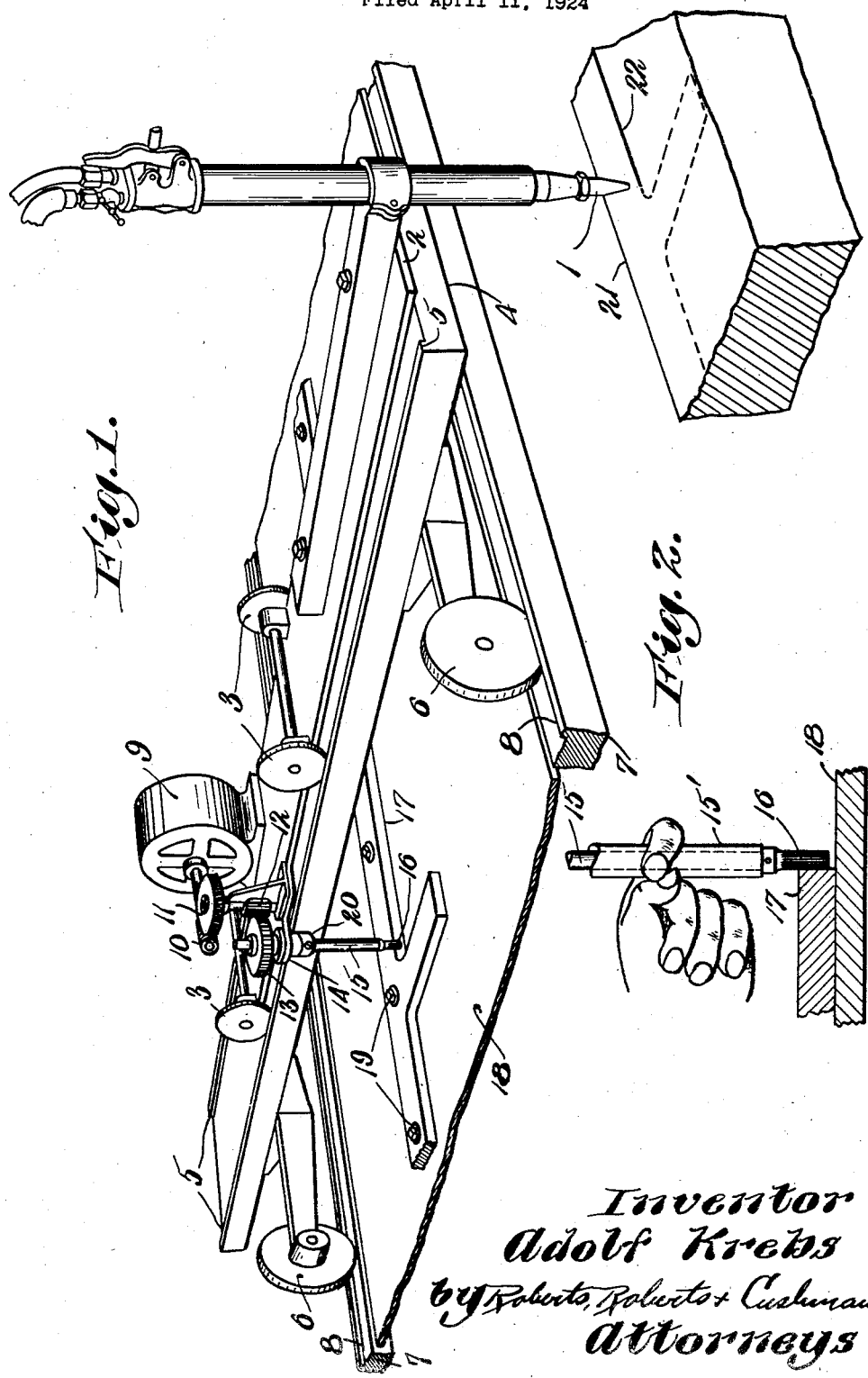
Inventor
Adolf Krebs
by Roberts, Roberts & Cushman,
Attorneys Patented Oct. 6, 1925.

1,555,992

UNITED STATES PATENT OFFICE.

ADOLF KREBS, OF BOSTON, MASSACHUSETTS.

METAL-CUTTING MACHINE.

Application filed April 11, 1924. Serial No. 705,838.

*To all whom it may concern:*

Be it known that I, ADOLF KREBS, a citizen of Germany, and resident of Boston, in the county of Suffolk and State of Massachusetts, have invented new and useful Improvements in Metal-Cutting Machines, of which the following is a specification.

This invention relates to machines for automatically moving and controlling the movements of an operative instrumentality in a predetermined manner with respect to work material, particularly a thermal instrumentality such as a blow-torch moved by a template follower automatically propelled along a template by a motor or other source of power.

However, machines using this arrangement are generally designed in such a way that the template follower or other part of the mechanism is supported by the template, thus requiring the use of a template capable of sustaining the weight of this mechanism without serious warping, buckling, or loss of shape, and requiring the use of an objectionably complicated template and template follower. In prior machines, direct movement of the follower from one part of the template to another generally requires lifting the follower, stopping the motor drive, uncoupling the mechanism, forcing the movement of the follower with an excessive force, or other inconvenient operation consuming an objectionable amount of time. Another difficulty is encountered in prior machines when an attempt is made to suddenly stop the movement of the follower along the contour of the template, it usually being necessary to lift the follower or otherwise move it in a manner involving several manipulations, thus consuming time and adding to the unproductive work. If the movement of the follower is interrupted by opening the circuit of the motor which drives it, a period of time is consumed before the motor stops, and again a period of time lapses after starting before normal speed is attained.

Objects of the present invention are to overcome the above difficulties and objections, to provide apparatus for accurately and reliably cutting, welding, or carrying out other operations along a path corresponding to a given pattern or template and to arrange the apparatus so that it is adapted to use an extremely simple form of template readily constructible from cheap and easily obtainable material such as cardboard, fiber, wood, or other easily worked material, the arrangement being such that the template is not required to support any additional weight, to provide for quick movement of the follower from one part of the template to another without complication and without lifting the follower, to provide for quick starting and stopping of the propulsion of the template follower, to provide a suitable manual control for an automatically propelled template follower, and generally to improve apparatus of the kind referred to.

For the purpose of illustrating the principles of the invention, a preferred embodiment is illustrated in the accompanying drawing, in which:—

Fig. 1 is a perspective view of a portion of a torch-cutting machine; and

Fig. 2 is an elevation showing a modification of a portion of Fig. 1.

In the particular form of the invention illustrated, a blow-torch is mounted for universal movement in a horizontal plane. A template following shaft, rigidly coupled to the torch, is rotated at a predetermined rate by a motor and manually controlled in its relation to the edge of the template. The movement of the torch is thus directly controlled at the will of the operator, the follower being pressed into contact with the template to move the torch and being displaced slightly from the template to stop movement. This arrangement, in addition to its desirable operating and control features, is adapted to use a simpler form of apparatus than prior machines of which I am aware, the template in particular being extremely simple in construction and adapted to be cut from relatively soft material such as wood, pulp, or other easily workable material in comparatively thin sheet form.

Referring to Fig. 1, the blow-torch or other instrumentality 1, arranged to project a cutting blast vertically downward, is supported from one end of the carriage 2, mounted on wheels 3, supported on the horizontal floor of carriage 4, provided with upwardly protruding guides 5 for restricting carriage 2 to linear movement with respect to carriage 4 by engaging the margins of wheels 3. Carriage 4 is provided with wheels 6 supported on horizontal rails 7, having upwardly protruding guides 8 for restricting the carriage to linear movement transverse to that of carriage 2. Motor 9 supported on carriage 2 is provided with the rotor worm 10 meshing with gear 11 to which is coupled the pinion 12 meshing with gear 13 fast to the template follower shaft 15 journalled on a vertical axis in the bearing bracket 14 supported from carriage 2. The periphery of the lower end portion 16 of shaft 15 is provided with axial ridges or otherwise provided with a frictional surface for engagement with the vertical edge of the horizontal sheet template 17 supported from the table 18 and made fast thereto by bolts 19.

Downward axial movement of shaft 15 is prevented by abutment of gear 13 on the bearing 14 while upward axial movement is prevented by collar 20 fast to shaft 15 and abutting on bearing 14. The portion 15 of the shaft below gear 13 and bearing 14 and above the template follower portion 16 is proportioned to have such a diameter and extent as to be readily grasped by the hand or fingers and is provided with a relatively smooth surface to minimize friction with the hand when the shaft rotates.

If desired, the shaft portion 15 may be made of smaller diameter than that just described and may be journalled within the annular sleeve 15' (Fig. 2), the lower end of which abuts on the template follower portion 16 which in this case is of slightly larger diameter than shaft 15. With this form of construction the collar 20 is omitted and sleeve 15' depends from and is fast to the bracket 14. Downward movement of shaft 15 is prevented by abutment of gear 13 on bracket 14 while upward movement of shaft 15 is prevented by abutment of template follower portion 16 on the sleeve 15'.

It will be noted that the lower end of shaft 15 terminates at a point between the upper and lower surface planes of the template, this arrangement permitting the support of the template directly on a flat table without requiring the use of spacing elements beneath the template. However, if desired, when the template is made of thin material such as cardboard, for example, it may be supported with a slight spacing from the top of the table so that the shaft portion 16 can positively engage the edge of the template without being inconveniently close to the table top.

In operating the machine, the template follower is grasped at the hand portion 15 and the axis of the shaft is urged in a horizontal direction toward template 17, so that the template following portion 16 is pressed into frictional engagement with the template. Motor 9, acting through the speed-reducing gears 10, 11, 12 and 13, causes rotation of shaft 15 at a predetermined rate independent of the manually applied pressure. The template follower is thus automatically moved by rolling along the edge of the template, thereby propelling carriage 2 and torch 1 synchronously in accordance with the contour of the template. The material 21, being worked upon, is accordingly cut along the path 22 indicated by the full line, the dotted line continuation of line 22 representing the path to be cut by the torch upon further movement of the follower along the template. In this manner the block of metal or other material 21 is cut accurately to conform with the pattern of template 17.

In order to stop the propulsion of the template follower 16 and the torch 1, it is only necessary to displace shaft 15 slightly from the edge of the template, thus instantly stopping further travel of carriage 2 and the torch by directly applied manual control. To start again it is merely necessary to move shaft 15 slightly to re-establish contact between the follower and the template.

When changing the position of the follower from one part of the template to another, the operator retains his grasp on the shaft and is free to move the shaft around to the desired position without having to raise it or make new adjustments. By supporting shaft 15 so that it is substantially immovable axially, the follower always engages the template in substantially the same relation, thus affording accurate and uniform operation of the apparatus.

I claim:
1. In a machine of the class described, in which a template following element engages a fixed template, the method of operation which comprises rotating the template following element, and manually pressing its periphery into contact with the template, whereby the follower is guided along the contour of the template.

2. In a machine of the class described having a rotatable shaft for following the contour of a template, the method of operation which comprises manually pressing the shaft against the template, and rotating the shaft at a predetermined rate substantially independent of the manually applied pressure to cause the shaft to follow the contour of the template.

3. In a machine of the class described, in which a template following shaft engages the edge of a fixed sheet template, the method of operation which comprises rotating the shaft, manually pressing the periphery near one end of the shaft into contact with the side of the template, and holding the shaft immovable axially.

4. In a machine of the class described, a thermal cutting tool, means supporting said tool for universal movement in a plane, a template following element supported from said means, means for rendering said element axially immovable, and means for rotating said element on an axis normal to said plane.

5. In a machine of the class described, a thermal cutting tool disposed to cut in a vertical direction, a carriage rigidly supporting said tool, means for supporting and linearly guiding said carriage, a second carriage for supporting said last means and arranged for movement transversely to said first carriage, a vertically disposed template following shaft rigidly coupled to said tool by said first mentioned carriage, means for preventing axial movement of said shaft with respect to said carriage, and means for rotating said shaft.

6. In a machine of the character described, a template following shaft, means for supporting said shaft for rotation on a vertical axis and for rendering said shaft axially immovable, said shaft having a portion for engaging in following contact with a fixed template, and means for rotating said shaft, thereby to propel said shaft and support in accordance with the contour of the template.

7. In a machine of the class described, a fixed sheet template having an edge normal to the sheet, a template follower having a portion near one end for engaging in rolling contact with the edge of said template, means supporting said follower for universal movement in a plane and for rendering said follower substantially immovable in a direction normal to said plane, and means for rotating said follower.

8. In a machine of the class described, a fixed sheet template having an edge normal to the sheet, a template follower having a portion near one end for engaging in rolling contact with the edge of said template, means supporting said follower for universal movement in a plane and for rendering said follower substantially immovable in a direction normal to said plane, the end of said follower engaging in contact with the template terminating at a point between the sides of the template.

9. In a machine of the class described, a thermal cutting tool, means for supporting said tool for universal movement in a plane, a fixed sheet template having an edge to be followed, said template being parallel to the plane of movement of said tool, a template following element supported from said means, means for rendering said element axially immovable and means for rotating said element on an axis normal to said template.

10. In a machine of the class described, a template following shaft, means for supporting said shaft for rotation on a vertical axis and for preventing axial movement of said shaft, said shaft having a portion for engaging in rolling contact with a fixed template, a thermal cutting device rigidly coupled to said supporting means, and means for rotating said shaft, thereby to propel said shaft and cutting device in accordance with the contour of the template.

11. In a machine of the class described, a vertically disposed template following shaft, means for supporting said shaft at its upper end, said shaft having a smooth handle portion and a driving portion below said supporting means, said driving portion having a frictional surface for bearing against a template, and means for rotating said shaft, thereby to correspondingly move said support.

12. In a machine of the class described, a fixed template, a template following shaft, means for supporting said shaft with its axis normal to said template and with its periphery tangent to the edge of the template, said shaft having a handle portion whereby the axis of the shaft is manually urged toward the edge of the template, and means for rotating said shaft.

13. In a machine of the class described, a fixed template, a template following shaft, means for supporting said shaft with its axis normal to said template and with its periphery tangent to the edge of the template, said shaft having a handle portion between its ends whereby the axis of the shaft is manually urged toward the edge of the template, and means for rotating said shaft.

14. In a machine of the class described, a fixed template, a template following shaft, means for supporting said shaft with its axis normal to said template and with its periphery at one end of the shaft tangent to the edge of the template, and means coupled to the other end of said shaft for causing rotation thereof, said shaft having a handle portion between said ends whereby the axis of the shaft is manually urged toward the edge of the template.

15. In a machine of the class described, a vertically disposed template following shaft, means for supporting said shaft for universal movement in a plane and for rotation on an axis normal to said plane, a lower portion of said shaft having a periphery for engaging a fixed template, and means coupled to an upper portion of said shaft for causing rotation thereof, said shaft having a handle portion between said upper and lower portions.

Signed by me at Boston, Massachusetts this 9th day of April 1924.

ADOLF KREBS.